Aug. 26, 1969

E. N. TAYLOR

3,463,937

REGENERATIVELY SWITCHED SAWTOOTH AND SQUAREWAVE GENERATOR

Filed July 1, 1966

INVENTOR.
ELMER N. TAYLOR,
BY
AGENT.

United States Patent Office 3,463,937
Patented Aug. 26, 1969

3,463,937
REGENERATIVELY SWITCHED SAWTOOTH AND SQUAREWAVE GENERATOR
Elmer N. Taylor, Escondido, Calif., assignor to Hughes Aircraft Company, Culver City, Calif., a corporation of Delaware
Filed July 1, 1966, Ser. No. 562,203
Int. Cl. H03k 4/00, 3/26
U.S. Cl. 307—228                  2 Claims

ABSTRACT OF THE DISCLOSURE

The sawtooth and squarewave generator of this disclosure comprises a capacitor, a constant current source for charging the capacitor, and a two-transistor regenerative switch that discharges the capacitor. The capacitor is discharged through the regenerative switch when the voltage of the capacitor reaches a predetermined level determined by the amplitude of an applied voltage. The generator may be operated in a single pulse mode or in a repeating pulse mode.

---

Figure 1:
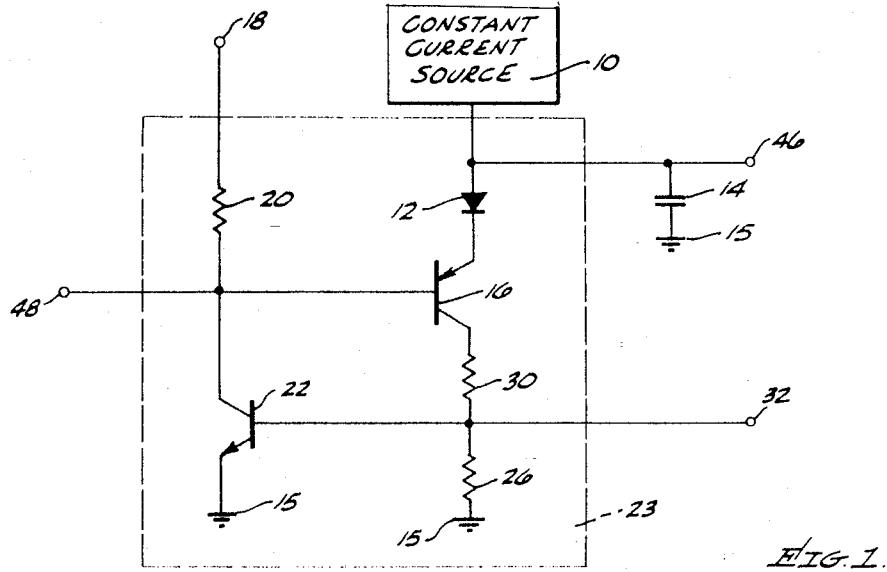

This invention relates to an electronic pulse generator and more particularly to a novel and improved sawtooth and squarewave pulse generator capable of generating single pulses or generating reoccurring pulses or the like.

Briefly described the present invention comprises a current generator which charges an electronic storage device such as a capacitor or the like to a predetermined level. If the current generator provides constant current the capacitor will charge linearly to its predetermined value. The rate of charge of the capacitor from the current generator determines the slope or ramp of the pulse generated. A regenerative compound switching arrangement is provided to discharge the capacitor after a predetermined charge has been attained thereon. The present invention includes further switching means for operation in a single pulse mode or a free-running mode.

It therefore becomes one object of this invention to provide a novel and improved electronic pulse generator.

Another object of this invention is to provide a novel and improved variable pulse generator which is capable of generating pulses of varying width.

Another object of this invention is to provide a novel and improved pulse generator which is more flexible in that it provides a pulse generator operable in a triggered or in a free running mode.

Another object of this invention is to provide a novel and improved linear ramp generator that includes the capabilities of changing ramp duration while retaining constant amplitude.

Another object of this invention is to provide a novel and improved pulse generator which is operable over a wide range of pulse durations and pulse amplitudes.

These and other objects will become more apparent when taken into consideration with the following detailed description in connection with the drawing which illustrates a preferred embodiment of this invention and wherein.

Figure 2:
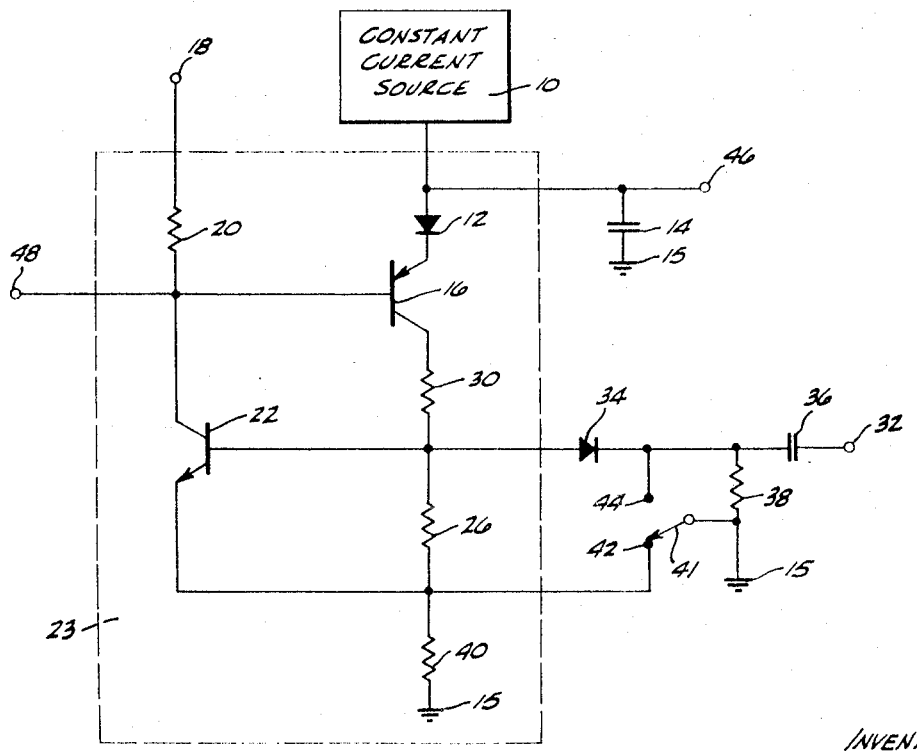

FIGURE 1 is a simplified schematic diagram of one embodiment of the linear ramp and squarewave pulse generator of this invention; and FIG. 2 is a more detailed schematic diagram of another embodiment of the linear ramp and squarewave pulse generator of this invention.

Referring now to the drawings there is shown in FIG. 1 a constant current generator 10, the output of which is coupled to the anode of a diode 12 and to one terminal of a charging capacitor 14. The other end of charging capacitor 14 is coupled to ground reference 15. The cathode of diode 12 is coupled to the emitter of a transistor 16. The base of transistor 16 is coupled to terminal 18 through a resistor 20. Terminal 18 has a voltage source applied thereto. The base of transistor 16 is also coupled to the collector of a transistor 22 and to a terminal 48, and the emitter of transistor 22 is coupled to ground reference 15. The collector of transistor 16 is coupled to the base of transistor 22 through a current limiting resistor 30 and the base of transistor 22 is coupled to the ground reference 15 through a current limiting resistor 26. The base of transistor 22 is coupled to a terminal 32. The sawtooth pulse appears across capacitor 14 at terminal 46; the squarewave pulse appears at the base of transistor 16 at terminal 48.

The constant current source 10 charges the capacitor 14 to a predetermined value. Here it should be noted that if capacitor 14 is variable then the slope of the pulse generated by the circuit of this invention may be varied proportionately. The transistors 16 and 22 and associated circuitry operate as a compound regenerative switch, indicated generally by the numeral 23, which discharges capacitor 14 after the predetermined voltage value has been attained. The voltage amplitude of the sawtooth pulse formed when switch 23 discharges capacitor 14 is dependent on the voltage applied to the base of transistor 16 through terminal 18. Therefore, to vary the amplitude of the generated pulse, the voltage at terminal 18 may be varied within the normal collector rating of transistors 16 and 22. Thus a means of varying the amplitude of the output pulse is provided. If, for example, the desired amplitude of the output pulse is approximately 21 volts, the voltage applied to the base of transistor 16 from terminal 18 through resistor 20 should be sufficient to maintain the base of transistor 16 at approximately 22 volts. When the capacitor 14 charges from the constant current source 10 to the desired voltage, the voltage to the emitter of transistor 16 rises accordingly until transistor 16 turns on by virtue of its base-emitter voltage differential. When the emitter voltage of transistor 16 reaches a level approximately equal to or above 21 volts, transistor 16 will commence conducting and discharge capacitor 14. The amplitude of the squarewave pulse is equal to the voltage applied to terminal 18 minus the voltage drop across resistor 20.

When transistor 16 starts conducting the collector current thereof produces a voltage drop across resistor 26 and 30 and raises the base voltage on transistor 22 causing it to turn on. When transistor 22 turns on an additional current flows through resistor 20, thereby lowering the base voltage of transistor 16 and increasing the collector current of transistor 16. The greater the collector current of transistor 16 the more transistor 22 is turned on and the lower the voltage at the base of transistor 16. The voltage at the base of transistor 16 must be lowered in accordance with the voltage at the emitter of transistor 16 which is dependent on the discharge characteristic of capacitor 14 to keep transistor 16 on. This process is regenerative, driving transistors 16 and 22 further into saturation.

As a result of the switching action of the regenerative switch 23, capacitor 14 is discharged to less than 1 volt through the path from emitter to base of transistor 16 and from collector to emitter of transistor 22. The current provided by current source 10 now flows primarily through the aforementioned capacitor 14 discharge path, but with a small amount of current passing through the emitter to collector junction of transistor 16 and resistors 30 and 26. This current from the emitter to the collector of transistor 16 is adequate to hold transistors 16 and 22 turned on until an outside negative voltage pulse is applied to a terminal 32, causing transistor 22, and in turn transistor 16, to turn off. Hence, the charge on capacitor 14 remains near zero until regenerative switch 23 is turned off. With switch 23 off, the charge on capacitor 14 will again rise linearly to a predetermined value depending on the voltage applied at terminal 18 before switch 23 once again regeneratively turns on.

FIG. 2 illustrates a more sophisticated embodiment of the invention wherein alternatively either a one pulse mode or a free-running mode is possible. This is accomplished by adding a diode 34 in series with the base of transistor 22 and the switch shut off terminal 32. Specifically, the anode of diode 34 is coupled to the base of transistor 22 and the cathode of diode 34 is coupled to the terminal 32. A coupling capacitor 36 may also be placed in series with the diode 34 and the terminal 32. A resistor 38 has one end thereof coupled between the capacitor 36 and the diode 34 and the other end thereof coupled to ground reference 15. A further resistor 40 has one end coupled to the emitter of transistor 22 and the other end coupled to ground reference 15. The embodiment shown in FIG. 2 has a switch 41 coupled to ground reference 15. Switch 41 has one contact 42 thereof coupled to the emitter of transistor 22 and another contact 44 coupled to the cathode of diode 34. When contact 42 of switch 41 is engaged (as illustrated in FIG. 2), the circuit of the invention operates in the single pulse mode as described above in reference to FIG. 1.

To operate in the free-running mode the switch 41 is moved to contact 44, thus the base of transistor 22 is clamped to approximately +0.7 volt by diode 34; a resistor 40 having a low resistance is coupled between ground reference 15 and the emitter of transistor 22. During the discharge of capacitor 14 the base of transistor 22 can never rise above +0.7 volt due to the clamping action of diode 34. This voltage would normally hold transistor 22 on, except that the emitter of transistor 22 is now able to rise above ground due to the current through resistor 40 (which is the total current from constant current source 10). Resistor 40 is chosen to have a resistance such that the voltage drop across resistor 40 when subtracted from the voltage drop across diode 34 is adequate to result in turning off transistor 22 and consequently switch 23. As soon as the switch 23 turns off capacitor 14 starts to charge linearly once again and the sequence repeats. Proper selection of the resistor 40 allows the charge on capacitor 14 to fall virtually to zero before transistors 16 and 22 turn off due to the combination of reduced gain which is caused by reduced collector-emitter current of transistor 16 and by cutoff of transistor 22 caused by a lack of adequate base drive voltage.

A terminal 46 coupled to the junction of the anode of diode 12 and the capacitor 14 will thus supply the linear ramp pulse either in a single pulse or a free-running mode dependent upon the selection of setting of switch 41. A terminal 48 coupled to the base of transistor 16 will provide a square wave pulse equal in duration and coincident in time to the linear ramp pulse.

Having thus explained preferred embodiments of this invention what is claimed is:

1. A pulse generator for generating squarewave and sawtooth pulses, comprising:
  a capacitor;
  a constant current source coupled to said capacitor for charging said capacitor;
  regenerative switching circuitry having capacitor discharging and capacitor charging states and coupled across said capacitor, said switching circuitry including first and second transistors each having a collector, a base and an emitter electrode, both said first and second transistors being non-conductive of current during said charging state and conductive of current during said discharging state, the emitter electrode of said first transistor being coupled to said constant current source and to one terminal of said capacitor, the base electrode of said first transistor being coupled to the collector electrode of said second transistor, the emitter electrode of said second transistor being coupled to another terminal of said capacitor;
  a voltage divider network including two resistors coupled in series between said another terminal of said capacitor and the collector electrode of said first transistor, the junction between the voltage divider resistors being coupled to the base electrode of said second transistor;
  means for applying a control voltage to the base electrode of said first transistor and the collector electrode of said second transistor, the magnitude of said control voltage determining the amplitude of the circuit output pulse;
  a squarewave pulse output terminal coupled to the base electrode of said first transistor;
  a sawtooth pulse output terminal coupled to said one terminal of said capacitor; and
  means for applying a triggering pulse to the base electrode of said second transistor to cause said second transistor to become non-conductive of current.

2. A pulse generator for generating squarewave and sawtooth pulses, comprising:
  a capacitor;
  a constant current source coupled to said capacitor for charging said capacitor;
  regenerative switching circuitry having capacitor discharging and capacitor charging states and coupled across said capacitor, said switching circuitry including first and second transistors each having a collector, a base, and an emitter electrode, both said first and second transistors being non-conductive of current during said charging state and conductive of current during said discharging state, the emitter electrode of said first transistor being coupled to said constant current source and to one terminal of said capacitor, the base electrode of said first transistor being coupled to the collector electrode of said second transistor, the emitter electrode of said second transistor being coupled to another terminal of said capacitor;
  a voltage divider network including first, second and third resistors coupled in series between said another terminal of said capacitor and the collector electrode of said first transistor so that said first resistor is coupled to said collector and said third resistor is coupled to said another terminal, the junction between said first and second resistors being coupled to the base electrode of said second transistor, the junction between said second and third resistors being coupled to the emitter electrode of said second transistor;
  a switching network having first and second switching terminals and a movable selector arm, said arm being coupled to said another terminal of said capacitor and said first switching terminal being coupled to said junction between said second and third resistors;
  a diode coupled between the junction between said first and second resistors and said second switching terminal;
  means for applying a control voltage to the base electrode of said first transistor, the magnitude of said control voltage determining the amplitude of the circuit output pulse;

a squarewave pulse output terminal coupled to the base electrode of said first transistor;

a sawtooth pulse output terminal coupled to said one terminal of said capacitor; and means coupled to said diode for applying a triggering pulse to the base electrode of said second transistor when said selector arm contacts said first switching terminal to cause said second transistor to become non-conductive of current.

References Cited

UNITED STATES PATENTS 3,225,310  12/1965  Stratton et al. _____ 307—228 X

BERNARD KONICK, Primary Examiner

J. F. BREIMAYER, Assistant Examiner

U.S. Cl. X.R.

307—108; 320—1; 331—111